United States Patent [19]

Douglass, Jr.

[11] Patent Number: 4,771,708

[45] Date of Patent: Sep. 20, 1988

[54] INCINERATOR AND HEAT RECOVERY SYSTEM FOR DRYING WOOD POLES

[76] Inventor: Edward T. Douglass, Jr., 3084 Sterling Rd., Birmingham, Ala. 35213

[21] Appl. No.: 141,850

[22] Filed: Jan. 11, 1988

[51] Int. Cl.[4] ............................................. F23B 7/00
[52] U.S. Cl. .................................. 110/233; 34/79; 110/162; 110/216; 110/224; 110/341
[58] Field of Search ............... 110/203, 216, 224, 233, 110/341, 160, 162; 34/79

[56] References Cited

U.S. PATENT DOCUMENTS

| | | | |
|---|---|---|---|
| 3,675,600 | 7/1972 | Jones | 110/233 X |
| 3,695,192 | 10/1972 | Von Brimer | 110/160 X |
| 4,017,254 | 4/1977 | Jones | 110/233 X |

Primary Examiner—Edward G. Favors
Attorney, Agent, or Firm—Jennings, Carter, Thompson & Veal

[57] ABSTRACT

An incinerator system utilizes recovered heat from the incineration of wood waste left by harvesting of forests to dry green wood products. An automatic feeder loads waste wood into a furnace which discharges combustion gases through a stack wherein a spiral air flow is induced to separate a portion of the gas carrying cinders and sparks from the axial movement of the remainder of gas. The cinder laden hot gases pass through a precipitation chamber where the cinders are recovered and returned to the furnace. The de-cindered gas is then admitted to a kiln via a modulating damper to dry wood.

11 Claims, 2 Drawing Sheets

INCINERATOR AND HEAT RECOVERY SYSTEM FOR DRYING WOOD POLES

FIELD OF THE INVENTION

The present invention relates to incinerating wood and wood by-products and recovering a portion of the heat generated thereby for use in drying flammable products such as wood poles or lumber in a kiln. More particularly, the present invention relates to such apparatus wherein cinders are prevented from escaping to the atmosphere.

BACKGROUND OF THE INVENTION

Numerous incinerators have been developed to dispose of trash or unusable organic materials. In some instances precautions have been taken to limit the discharge of sparks and hot cinders from such incinerators. One example of such an apparatus is disclosed in my U.S. Pat. No. 3,810,432. In regions of the world where the forests remain one of our great natural resources, there exists a need for an efficient drying apparatus for green lumber and poles which have been harvested. The harvesting of such wood products, furthermore, leaves substantial quantities of limbs, roots, and splinters which must be removed. Routinely such remnants are burned, yet such a practice is hazardous to the remaining forest. These dual factors, the need for a drying apparatus and the disposal of remnants, have somewhat hindered the advancement of harvesting a large portion of the world's forests.

SUMMARY OF THE INVENTION

It is the object of the present invention to expedite the harvesting and curing of wood products in highly forested areas.

Yet another object of the invention is to utilize the refuse generated by harvesting operations without endangering the forest.

Still another object of the invention is to provide a drying apparatus for harvested wood which does not require excessive fueling with expensive fossil fuels.

These and other objects and advantages of my invention are provided by improvements over my above referenced U.S. patent and its applications to the instant problems. The apparatus disclosed in the U.S. Pat. No. 3,810,432, while suitable for recapturing a major portion of the cinders, did not make the most efficient use of the recoverable heat from incineration. In the instant invention, a furnace is provided for the incineration of organic matter delivered thereto by an automated feeder device. The furnace receives forced air for combustion and has a cylindrical stack mounted thereon for discharge of the combustion gases. The stack is provided with tangential openings in the manner taught in the above referenced patent to admit fresh air for intermingling with the hot combustion gases thereby inducing a spiral air flow which causes a centrifugal migration of cinders as they are carried up the stack by the airflow. Proximal the top of the stack a plenum surrounds the stack and communicates therewith through a plurality of elongated arcuate ports subtending overlying portions of the circumference of the stack such that cinders bearing against the internal wall of the stack are discharged into the plenum or are drawn thereinto by an airflow due to a lower pressure induced within the plenum by a fan. The fan is connected to the plenum via a conduit which contains a precipitate trap wherein the cinders are separated from the airflow. The separated cinders are reintroduced to the furnace and the hot gases which had carried the cinders are used to heat a kiln for drying green wood products.

BRIEF DESCRIPTION OF THE DRAWINGS

Apparatus embodying features of my invention are depicted in the accompanying drawings which form a part of this disclosure and wherein.

DESCRIPTION OF A PREFERRED EMBODIMENT

Figure 1:
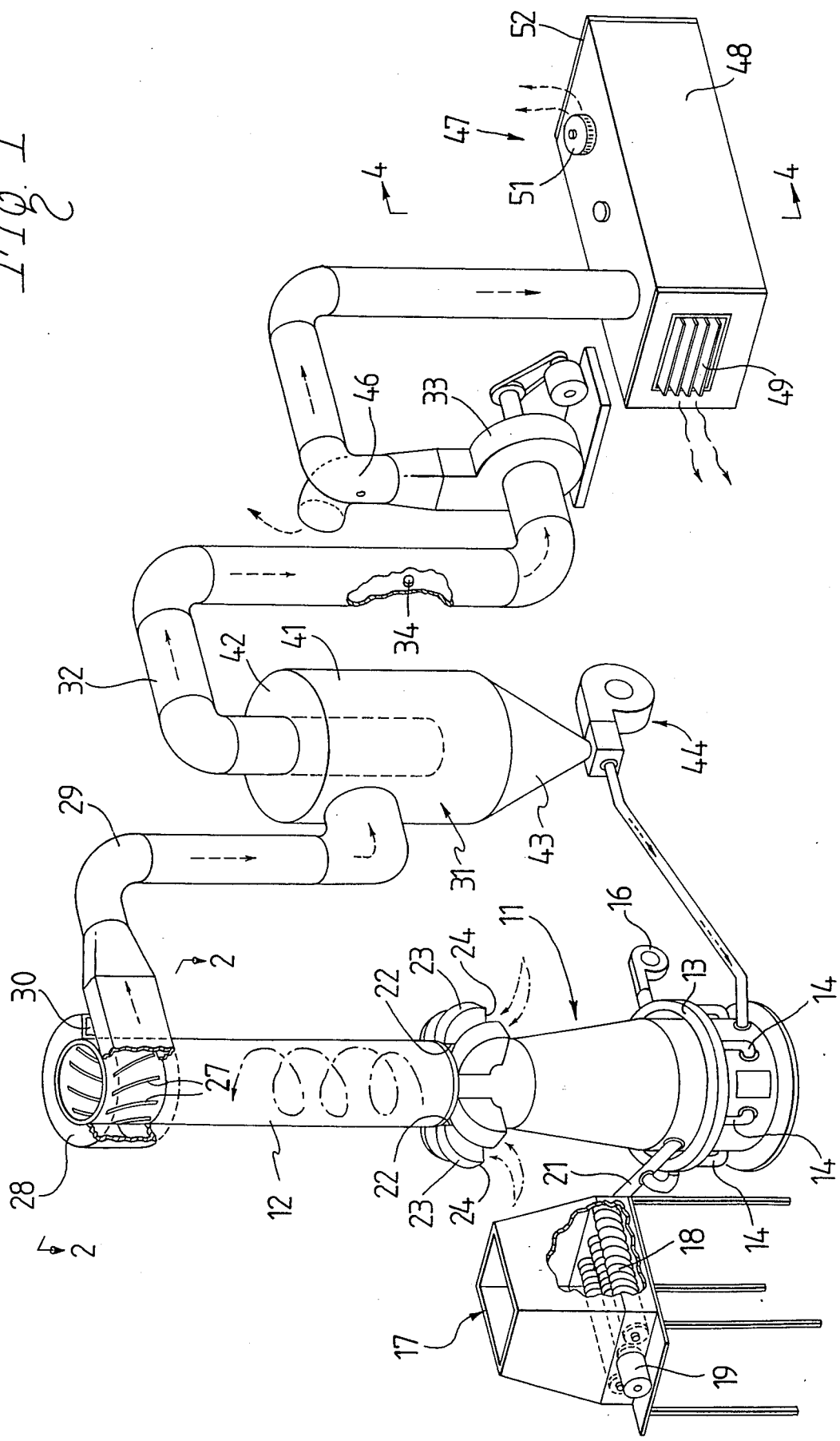
FIG. 1 is a perspective view partially in section of my system.
Figure 2:
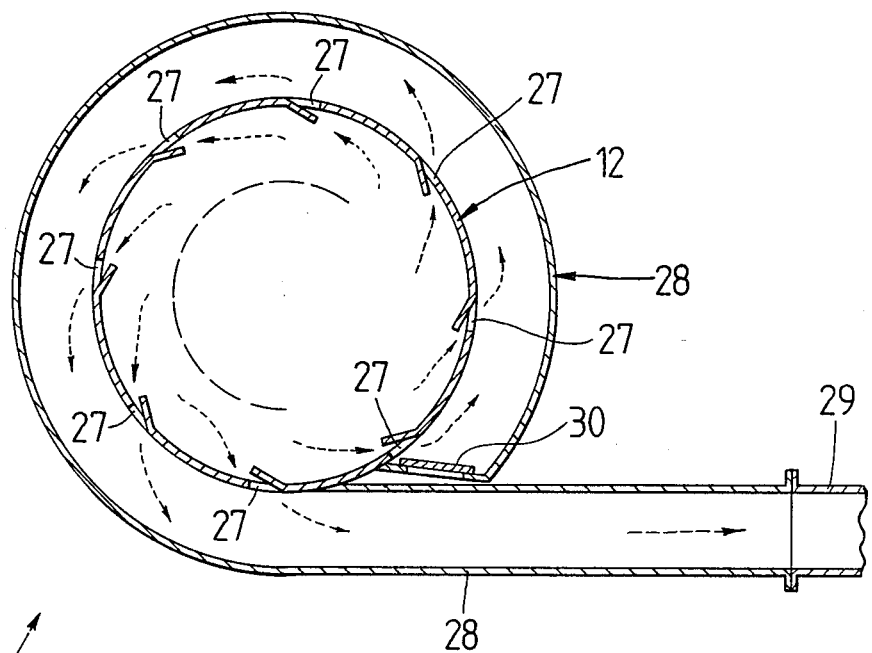
FIG. 2 is a partial sectional view of the plenum taken along line 2—2 of FIG. 2.
Figure 3:
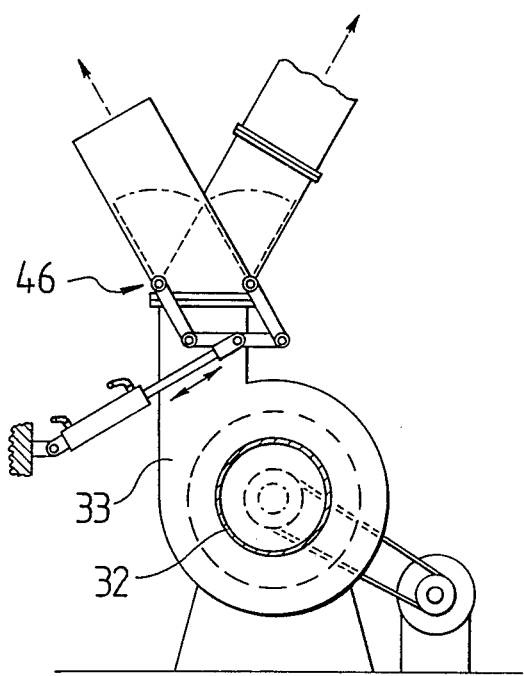
FIG. 3 is a side view partially in section of the modulating damper assembly.
Figure 4:
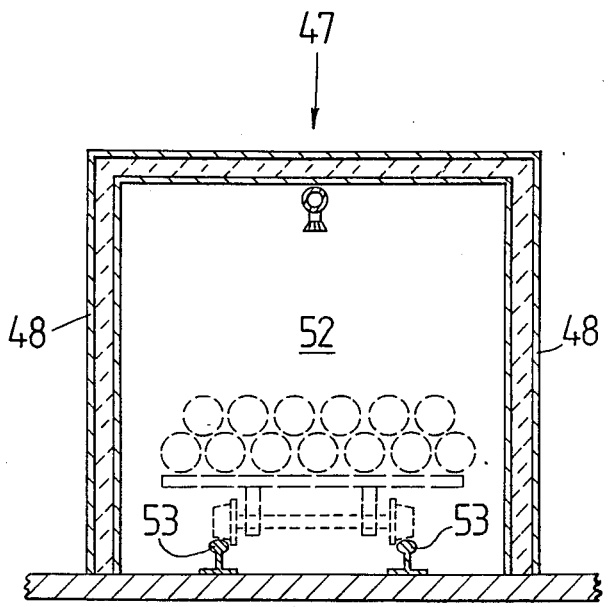
FIG. 4 is a sectional view of the kiln taken along line 4—4 of FIG. 1.

Referring to the Drawings for a better understanding of my invention, it may be seen that I provide a furnace 11 forming the lower portion of a chimney-like structure and a cylindrical stack 12 forming the upper portion of the structure. The furnace 11 is suitably lined with refractory materials as is well-known in the art and is provided with a circumferential bustle pipe 13 communicating with the furnace 11 through a series of inlet conduits 14. A suitable blower 16 forces combustion air through the bustle pipe 13 and inlet conduits 14.

The furnace 11 receives combustion fuel, which comprises wood, wood scraps, shavings and other by-products from a fuel bin 17. Mounted in the bottom of the bin 17 are three screw-type conveyors 18 driven by a variable speed motor 19 which can be manually set to deliver fuel to the furnace 11 at a predetermined rate. By way of example, the conveyor 18 may be three 12" diameter, 12' long, variable pitch screws and motor 19 may be a five horsepower electrical motor. The bin 17 itself may have a volume of about 300 cubic feet with a discharge chute 21 to the furnace 11. One of the inlet conduits 14 from bustle pipe 13 is connected to chute 21 to insure that air flow therein is toward the furnace 11, thus preventing backfiring into the bin.

The stack 12 has a series of angularly spaced tangential openings 22 formed therein proximal the top of the furnace 11. Each of these openings 22 receives air through a downwardly extending hollow housing 23 having an air intake 24 as taught in my U.S. Pat. No. 3,810,432 which is incorporated herein by reference. The introduction of cooler, denser, air through the tangential openings 22 at the bottom of the stack 12 induces a spiral circulation of rising gases within the stack 12 so that denser particulate matter, such as sparks and cinders, entrained in the rising gas flow tend to migrate outwardly to the interior walls of the stack. Thus as the heated gases rise through the stack 12, the gases moving along the longitudinal axis thereof are considerably freer of sparks, cinders, and dust than are the gases moving near the walls of the stack.

To prevent the sparks and cinders from being carried into the atmosphere from the stack, a series of parallel elongated ports 27 are angularly spaced about the upper portion of stack 12 and are inclined at an angle to the longitudinal axis of the stack 12 such that each port 27 extends beneath an adjacent port in the wall of stack 12. The ports 27 are inclined counter to the spiral flow of gases within the stack 12 such that sparks and cinders carried thereby are urged outwardly through the ports by centrifugal force and the flow of gases into a plenum 28 which surrounds the upper portion of the stack 12.

The plenum 28 is connected to a conduit 29 which is in turn connected to a precipitate chamber 31 which has an outlet to a second conduit 32 connected between the precipitate chamber 31 and a motor driven fan 33. The fan 33 is an exhaust fan and thus reduces the pressure within the plenum 28 thus aiding in withdrawing hot gases and entrained sparks and cinders through the ports 27. A smoke detector 34, having a predetermined alarm level, is placed in conduit 32 intermediate the precipitation chamber 31 and the fan 33. When the threshold level of smoke is exceeded, the detector 34 operates to stop motor 19, thus stopping the delivery of fuel to the furnace 11 until the smoke is again below an acceptable level.

The precipitation chamber 31 includes an outer housing 41 having a major axis perpendicular to conduit 29 at the inlet of conduit 29 to the chamber 31. The chamber 31 is closed at its top 42 about conduit 32 which extends axially within the housing 41 beneath the inlet from conduit 29. The bottom 43 of the housing is conical and is truncated at a blower assembly 44 which is connected by a return line to furnace 11. The precipitation chamber 31 causes radical changes in the direction of the gas and entrained cinders such that the momentum of the cinders separates them from the gas whereupon the cinders fall to the bottom 43 which funnels them to the blower assembly 44 for return to the furnace 11. In this manner the cinders are separated and reintroduced to the furnace to be completely burned.

The discharge outlet of fan 33 has a modulating damper 46 therein which is heat responsive or controlled by a thermostat 40 and acts as a proportioning valve to send a portion of the hot gases to a kiln 47 and to vent the remainder of the gases to the atmosphere. By way of example, the kiln temperature may be maintained by controlling the proportion of the hot gases which pass thereinto. The hot gases in the furnace 11 begin their ascent at about 2200° F. The gases entering the plenum 28 are at about 600° F. and the gases exiting the precipitation chamber are at about 450° F. The gases entering the kiln are between 150° F. and 450° F. A damper 30 is adjustable to admit fresh air to the plenum 28 to further control the temperature.

The kiln 47 is insulated internally of its walls 48 and includes a louvered venting window 49, a fan 51 and a door 52 through which a dolly laden with wooden poles can enter on a set of tracks 53.

From the foregoing, it may be seen that my apparatus provides a source of dry heat for use in drying poles or other products while eliminating waste wood by-products left by harvesting of the forests. Furthermore, my cinder entrapment and return eliminates the hazards of wildfires starting from wind blown cinders and eliminates the potential for delivery of hot cinders to the wood products in the kiln.

While I have shown my invention in one form, it will be obvious to those skilled in the art that it is not so limited but is susceptible of various changes and modifications without departing from the spirit thereof.

What I claim is:

1. Apparatus for supplying drying heat to a kiln or the like comprising:
    (a) a furnace having a forced air system for introducing combustion air thereinto;
    (b) means for supplying fuel to said furnace;
    (c) a cylindrical open ended stack extending upwardly from said furnace in communication therewith for conveying combustion gases upwardly;
    (d) a plurality of angularly spaced inlet conduits extending outwardly and downwardly from said stack proximal said furnace, whereby cooler air is introduced thereunto through tangential openings in said stack such that an upward spiral airflow is induced within said stack;
    (e) a plenum encircling the uppermost portion of said stack and communicating therewith through a plurality of elongated parallel ports inclined relative to the longitudinal axis of said stack;
    (f) conduit means connected to said plenum for receiving gases therefrom;
    (g) means for creating a pressure differential within said conduit means whereby gases from said stack are drawn thereinto;
    (h) means communicating with said conduit for removing cinders entrained by said gases drawn into said conduit and returning said cinders to said furnace; and
    (i) means for controlling the temperature within said kiln by diverting gases drawn through said conduit thereinto after said cinders have been removed.

2. Apparatus as defined in claim 1 further comprising means for detecting smoke in said conduit means, and means for controlling said means for supplying fuel in accordance with said smoke detecting means.

3. Apparatus as defined in claim 1 wherein each of said elongated ports extends partially about said shaft such that said ports overlap vertically.

4. Apparatus as defined in claim 1 wherein said means for removing cinders comprises:
    (a) a precipitation chamber wherein said gases within said conduit means are deflected perpendicularly to the axis of said conduit means and are urged upwardly from said precipitation chamber by said means for creating;
    (b) means for injecting air into said furnace form the bottom of said precipitation chamber such that cinders therein are entrained in the airflow to said furnace.

5. Apparatus as defined in claim 4 wherein said precipitation chamber comprises:
    (a) an enlarged housing, having a major axis perpendicular to said conduit means axis, in communication with said plenum via a portion of said conduit means;
    (b) a conical housing extending downwardly from said enlarged housing and communicating with said furnace via said means for injecting at the lower end of said conical section; and
    (c) a cylindrical baffle, concentric with said enlarged housing about said major axis, extending downwardly within said housing and providing communication with said means for creating via a portion of said conduit means.

6. Apparatus as defined in claim 1 wherein said conduit means comprises a first conduit extending from said plenum to said means for removing cinders, and a second conduit extending from said means for removing cinders to said means for creating a pressure differential such that air flows from said plenum to said kiln.

7. Apparatus as defined in claim 1 wherein said means for controlling the temperature with in said kiln comprises a modulating damper within said conduit means proximal said kiln, said damper movable to a first position whereat gases drawn through said conduit are directed into said kiln and a second position whereat said gases are directed into the atmosphere and a thermostat for sensing the temperature in said kiln and controlling the position of said damper.

8. A method for recovering heat from an incinerator for use in drying flammable products comprising the steps of:
  (a) incinerating organic material in a furnace having an elongated stack thereon for discharging gases created thereby, with said organic material being fed into said furnace at a predetermined rate;
  (b) introducing air from the atmosphere to said stack proximal said furnace such that a spiral flow of said gases within said stack is induced;
  (c) withdrawing a portion of hot gases and cinders entrained therewith radially through apertures in said stack while discharging the remainder of said gases axially of said stack;
  (d) removing said cinders from said portion of said gases; and
  (e) heating a kiln to a predetermined temperature with said portion of said gases subsequent to the removal of said cinders.

9. The method as defined in claim 8 further comprising sensing the amount of smoke in said portion of gases and controlling the rate of material being fed into said furnace to minimize smoke.

10. The method as defined in claim 8 further comprising injecting said cinders removed from said portion of gases into said furnace for reincineration.

11. The method as defined in claim 9 wherein the temperature of said kiln is maintained by a modulating baffle operating to discharge said portion of gases to the atmosphere or to said kiln in accordance with the temperature of said kiln.

* * * * *